Figure 1:
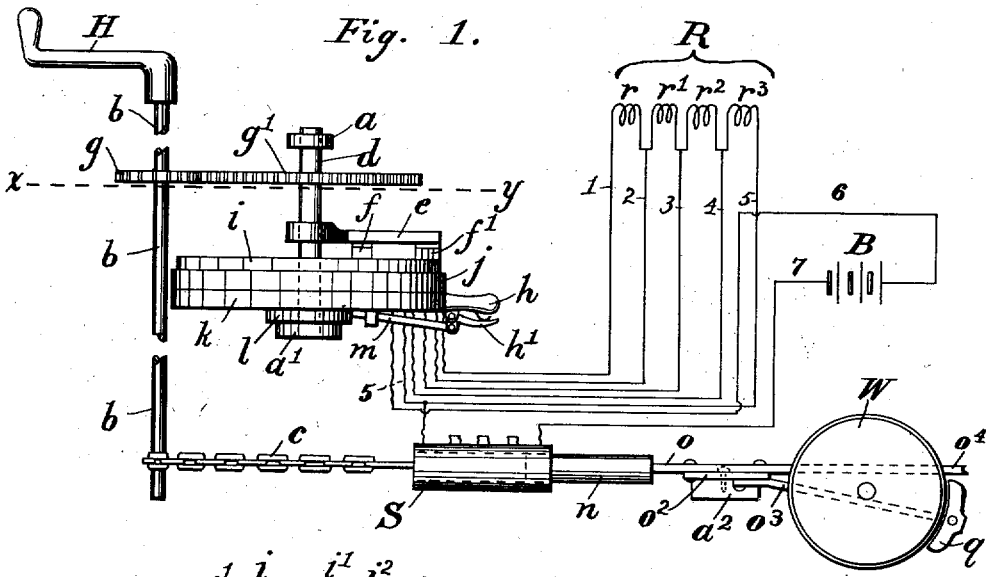

No. 11,945. Reissued Nov. 19, 1901.

A. GREEN.

RAILWAY BRAKE.

(Application filed July 27, 1901.)

3 Sheets—Sheet 1.

Witnesses

W. E. Eaton

E. M. Smith.

Inventor

Alfred Green

By Atty.

Wm. H. Cooley.

No. 11,945. Reissued Nov. 19, 1901.

A. GREEN.

RAILWAY BRAKE.

(Application filed July 27, 1901.)

3 Sheets—Sheet 2.

Witnesses
R. E. Eaton
E. M. Smith.

Inventor
Alfred Green
By Atty.
Wm. H. Cooley

No. 11,945. Reissued Nov. 19, 1901.

A. GREEN.

RAILWAY BRAKE.

(Application filed July 27, 1901.)

3 Sheets—Sheet 3.

Witnesses
C. E. Eaton
E. M. Smith.

Inventor
Alfred Green
By Atty.
W. H. Cooley.

UNITED STATES PATENT OFFICE.

ALFRED GREEN, OF ROCHESTER, NEW YORK, ASSIGNOR, BY MESNE ASSIGNMENTS, TO THE COMPOUND MAGNET BRAKE COMPANY, A CORPORATION OF NEW JERSEY.

RAILWAY-BRAKE.

SPECIFICATION forming part of Reissued Letters Patent No. 11,945, dated November 19, 1901.

Original No. 670,873, dated March 26, 1901. Application for reissue filed July 27, 1901. Serial No. 70,000.

*To all whom it may concern:*

Be it known that I, ALFRED GREEN, a citizen of the United States, residing at Rochester, in the county of Monroe and State of New York, have invented an Improvement in Railway-Brakes, of which the following is a specification.

In some cases an electrically-operated braking mechanism is arranged to be under the control of the same handle by means of which the brakes are applied by hand in the usual way, with the electrically-operated mechanism arranged to increase the braking effort applied through the same brake-shoes with the hand-operated mechanism.

In many electrically-operated braking mechanisms there is a range of movement over which the electrically-operated mechanism can travel with a comparatively high efficiency, and for any movement outside of that range the efficiency is comparatively low. When no braking effort is to be applied, it is desirable that the brake-shoes be entirely free from the braking-surfaces, and in braking mechanism as generally constructed there is considerable lost motion. To take up this lost motion and apply the brake-shoes to the braking-surfaces requires a considerable movement of the operating mechanism with but comparatively little effort; but from this point on the power necessary to apply the brakes increases with the braking effort. Owing to conditions resulting from wear and from such other changes as are continually taking place in the relations between the parts of the mechanism of each car the amount of movement of the operating-handle necessary to take up all lost motion and to bring the brake-shoes firmly up against the braking-suface varies from time to time, so that the point in the movement of the operating-handle where the electrically-applied braking mechanism should begin to secure the most efficient results varies in a similar way.

The object of my invention, then, is to provide means for varying, as desired, the point in the movement of the operating-handle at which the electrically-applied braking effort begins and also for varying the range of movement of such operating-handle throughout which such electrically-applied braking effort shall extend and to secure these desired variations by means of mechanism readily adjustable and under the immediate control of the motorman. An especial advantage to be derived from this adjustable feature is noted in cases where the amount of movement of the electrically-operated mechanism is comparatively small in order to secure the most efficient action. This occurs in braking mechanism actuated by a series of magnets and their armatures arranged to contact successively, so that some one or more of the armatures is always in a strong magnetic field or in an arrangement where a solenoid-core is arranged to move over a short space in order to secure the most efficient action. By rendering adjustable the point at which the electrically-applied braking mechanism begins by means of mechanism under the control of the motorman each motorman may from time to time adjust almost instantaneously the braking mechanism on his car in a way to secure the most efficient operation of the electrically-applied braking mechanism.

While I have shown in the accompanying drawings my invention as applied to an electrically-operated braking mechanism in which a solenoid is used to apply the braking effort between the shoes and the braking-surfaces, I do not, however, limit myself to such a construction, as my invention is equally applicable, as already above indicated, to all braking systems in which it is desired to apply a braking effort by means of an electrically-operated mechanism and to vary the point in the movement of the operating-handle at which the electrically-applied braking effort begins.

Figure 2:
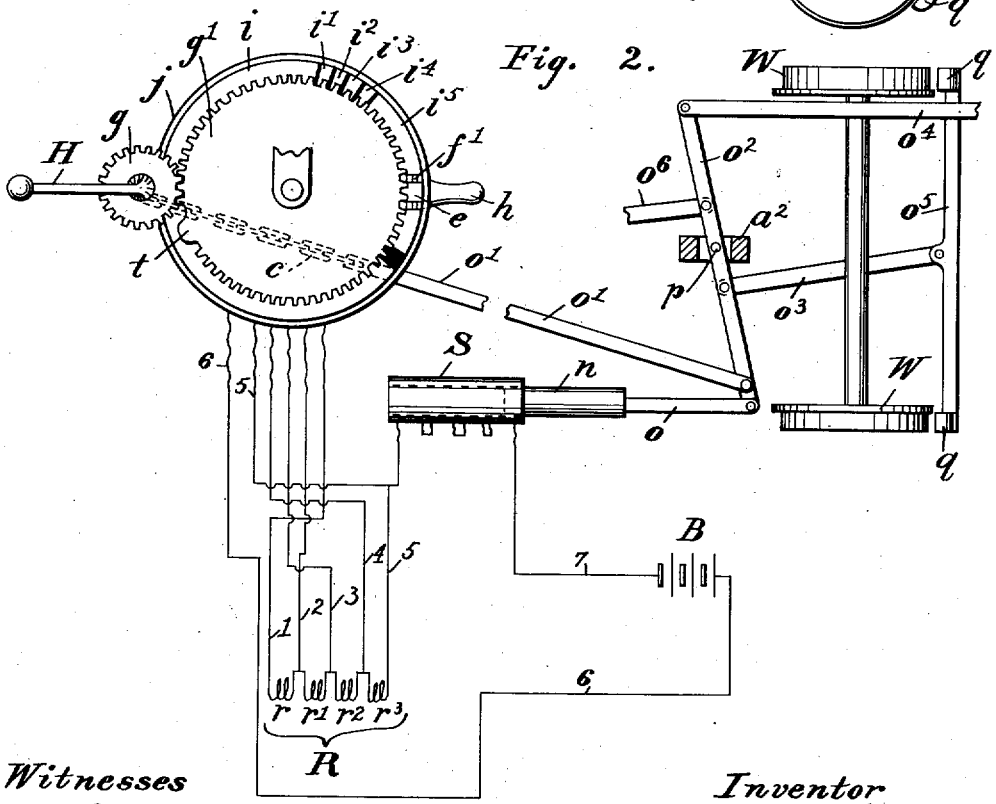
Figure 3:
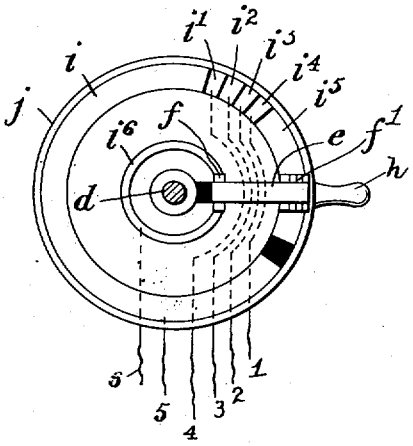
Figure 4:
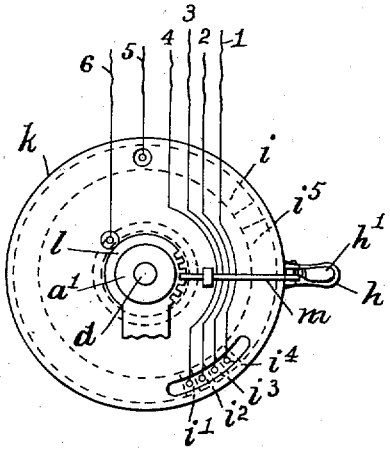
Figure 5:
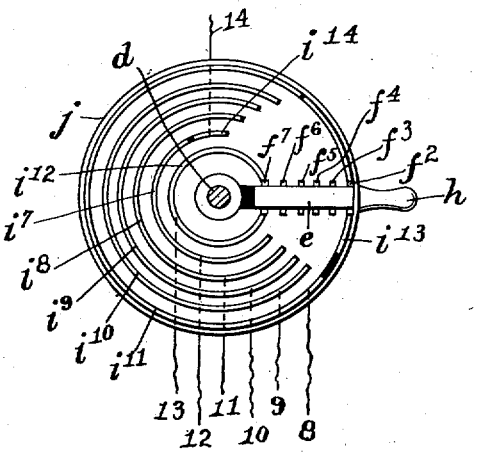
Figure 6:
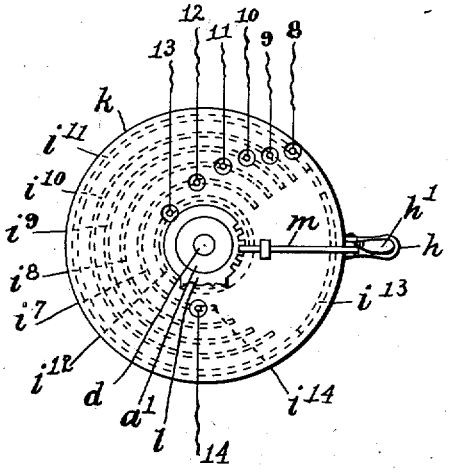
Figure 7:
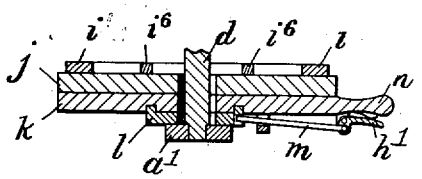
Figure 8:
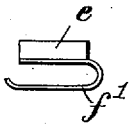
Figure 9:
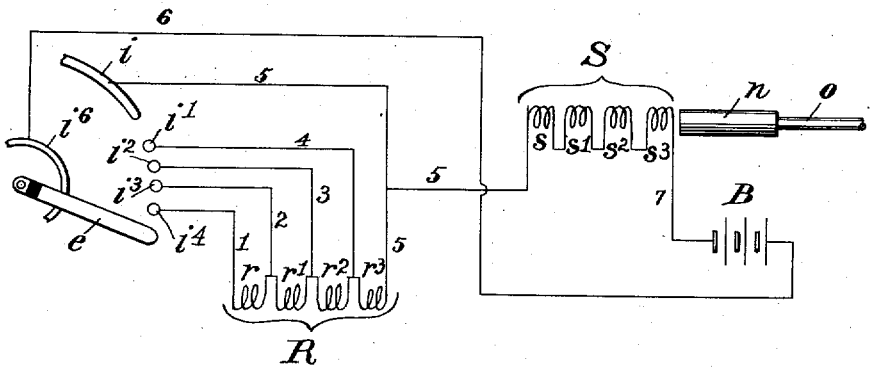
Figure 10:
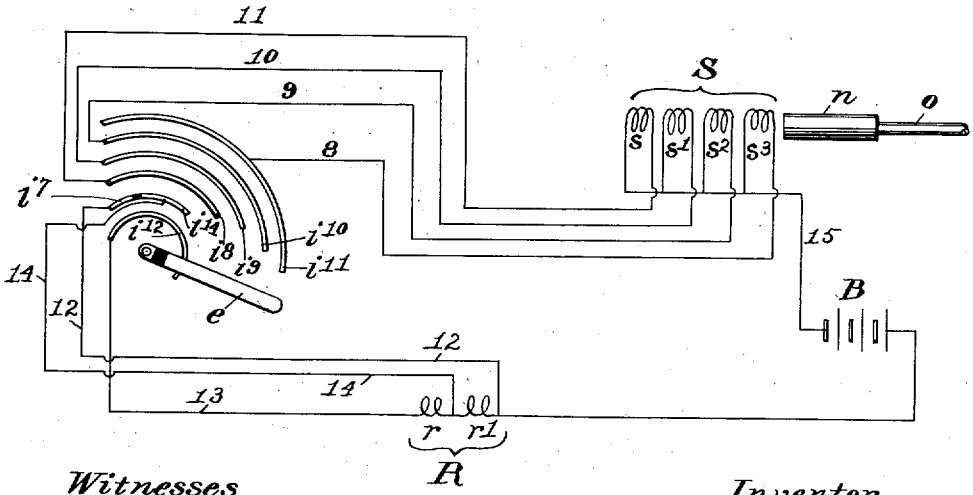

The accompanying drawings, illustrating my invention, are as follows: Figure 1 shows diagrammatically a pair of wheels and their accompanying brake-shoes, with such brake-shoes under the control of the ordinary brake-staff operated by hand and with connections to such brake-staff and mechanism under the control thereof such that the electrically-operated braking mechanism coöperates with the hand-operated braking mechanism and under the control of the same handle in accordance with my invention. Fig. 2 shows diagrammatically in plan view the parts seen in Fig. 1 with the parts above the dotted line $x\ y$ of Fig. 1 removed. In Figs. 1 and 2 the relation between the size of the parts is greatly distorted in order to bring into prominence the more essential features of the invention. There is also in these figures, as will be explained, a distortion as to the relative locations of the parts for the same reason. Figs. 3 and 4 show the contact-carrying base $j$ from the top and under sides, respectively, with the contacts so arranged that the several actuating-coils of the electrically-operated mechanism may be connected up in series with a rheostat which may be gradually cut out, while Figs. 5 and 6 show in views similar to Figs. 3 and 4, respectively, an arrangement of the contacts and connections thereto whereby the several coils of the electrically-operated mechanism may be connected up in parallel and all in series with a resistance which may be gradually cut out after all such coils are cut into circuit. Fig. 7 is a vertical sectional view of the contact-carrying base $j$ and its supporting-disk $k$. Fig. 8 is an end view of the contact-brush $f'$ and the arm $e$ for carrying the same. Figs. 9 and 10 are diagrammatic views of the circuit connections of the two modifications of my apparatus arranged for the connection of the energizing-coils of the electrically-operated mechanism respectively in series and in parallel.

Similar characters refer to similar parts throughout the several views.

Referring to the drawings, W represents the wheels of a car, and $q$ the brake-shoes carried upon the brake-beam $o^5$, arranged to receive the usual support. From the center of this brake-beam $o^5$ there extends a link $o^3$, pivoted at its left-hand end to the lever $o^2$, which in turn is pivoted at $p$ in the block $a^2$ in such a way as to swing horizontally. To one end of this link $o^2$ there is connected a rod $o$, which is secured to a solenoid-core $n$, arranged to work within the solenoid-coil S. There is also pivoted to this same end of the lever $o^2$ a link $o'$, at the left-hand end of which there is secured a chain $c$, the other end of which is secured to and arranged to be wound in the usual way upon the lower end of the brake-staff $b$, which may receive the usual support and is operated by means of a handle H, as seen at the upper end thereof. Upon this brake-staff $b$ there is secured a gear $g$, meshing with a gear $g'$, secured upon a shaft $d$, which has a bearing at its upper end in an arm $a$ and at its lower end in an arm $a'$, both of which arms may receive any suitable support. (Not shown.) Upon the arm $a'$ there is secured a block $l$, which, as seen in Fig. 7, forms the bearing for the iron disk $k$, to which in turn there is secured the slate base $j$, carrying the contacts $i$ and $i^5$, and between them the several contacts $i'\ i^2\ i^3\ i^4$, insulated from each other and from such contacts $i$ and $i^5$. These contacts $i$ and $i^5$ are separated by an insulating-block, as indicated in Fig. 3. The shaft $d$ carries an arm $e$, but insulated therefrom, as indicated, and from which there projects downward the brushes $f$ and $f'$. The brush $f$ is arranged to bear upon a continuous contact-ring $i^6$, while the brush $f'$ is arranged to bear successively upon the contacts $i^5$, $i^4$, $i^3$, $i^2$, $i'$, and $i$ as the shaft $d$ is rotated over to the left, as seen in Figs. 3 and 2, by a rotation of the handle H in the usual direction for setting the brakes by hand. These several contacts $i\ i'\ i^2\ i^3\ i^4\ i^5$ are secured in the usual way to a slate base $j$, which in turn is secured to the iron disk $k$. The contact-ring $i^6$ is also secured to this slate base $j$. Projecting from the iron disk $k$ is seen a handle $h$, by means of which the same may be adjusted angularly upon the supporting-block $l$, rigidly secured to the arm $a'$. Beneath this handle $h$ is seen a bell-crank lever $h'$, articulating with the right-hand end of a bolt $m$, the left-hand end of which passes through a suitable guide-piece on the under side of the disk $k$ and enters the notches formed therefor in the periphery of the supporting-piece $l$. The lever $h'$ is pivoted to ears formed on the under side of the handle $h$ and is held in the position shown in the drawings by means of a suitable spring, as shown. By lifting the lever $h'$ at the time of grasping the handle $h$, so as to draw the bolt $m$ out of engagement with the notches in the supporting-piece $l$, the disk $k$ may be adjusted angularly so as to vary the point in the movement of the arm $e$ at which the brush $f'$ will contact with the several contacts $i^5$, $i^4$, $i^3$, $i^2$, $i'$, and $i$. The relation between the gear $g$ and $g'$ is such that for a complete rotation of the gear $g'$, or, if desired, for something less than a complete rotation of such gear $g'$, the brakes are set by means of the handle H and the chain $c$ arranged to be wound upon the lower end of the brake-staff $b$. In Figs. 1 and 2 the wheels W are supposed to be the wheels at the right-hand end of the car, as seen from such figures, while the wheels at the left-hand end of the car are omitted. The brake-staff $b$, the handle H, and gear $g$ and $g'$, and the series of contacts and their supporting and adjusting mechanism are all supposed to be duplicated at the right-hand end of the car, together with a chain similar to the one $c$ and arranged to be wound upon a brake-staff at the right-hand end of the car, such chain connected with the link $o^4$, provided therefor. A link $o^6$ is also provided to make connection with a brake-beam similar to the one $o^5$ at the left-hand end of the car in the same way that the link $o^3$ does with the brake-beam $o^5$ shown in the drawings.

Refer now to Figs. 1, 2, 3, 4, and 9. B is any suitable source of electricity, having one terminal connected by means of wire 7 with the series of sections of the solenoid-coil S, of which there may be any desired number, four being indicated in the drawings. These coils are connected together in series, and from the other terminals of such sections of the solenoid-coil S a wire 5 extends to the rheostat R. From the several sections $r^3$, $r^2$, $r'$, and $r$ of the rheostat R there extend wires 4, 3, 2, and 1 to the several contacts $i'$, $i^2$, $i^3$, and $i^4$, respectively. The other terminal of the battery B is connected by means of wire 6 with contact-ring $i^6$. No connection whatever is made to the contact $i^5$, as it is used only as a bearing-surface to support the brush $f'$ when not upon any of the other contacts. From the contact $i$ connection is made by means of wire 5 directly to the left-hand end of the series of sections of the solenoid-coil S, the arrangement being such, as clearly indicated, that when the brush $f'$ is upon contact $i^5$ the solenoid S is not cut into circuit with the source of electric energy B; but when such brush $f'$ is upon contact $i^4$ then the solenoid S is cut into its energizing-circuit in series with the several sections $r$, $r'$, $r^2$, and $r^3$ of the rheostat R, and that as the brushes $f$ and $f'$ are moved over to the left, as seen in Fig. 3, so as to bring the brush $f'$ successively upon the contacts $i^3$, $i^2$, $i'$, and $i$, the several sections $r$, $r'$, $r^2$, and $r^3$, respectively, are cut out of circuit and in the order named, so that when the brush $f'$ is upon contact $i$ the solenoid S has impressed thereon the full potential from the source of electric energy B. By adjusting the disk $k$ angularly by means of the handle $h$, in the manner already explained, the point in the movement of the handle H, at which the solenoid S is cut into its operative circuit, may be varied as desired.

In some cases it is desirable that the several sections of the solenoid-coil S should be connected across the terminals of the source of electric energy B in parallel. The arrangement of contacts on the slate base $j$ for producing this result is seen in Figs. 5 and 6, while the circuit connections for this arrangement are clearly indicated in Fig. 10. In this case the source of electric energy B is connected by wire 13 to a continuous contact-strip $i^{12}$ through the sections $r$ and $r'$ of the rheostat R and to a contact $i^7$ by wire 12 through only the section $r'$ of the rheostat R and connected directly to the contact $i^{14}$ by wire 14. The several sections $s$, $s'$, $s^2$, and $s^3$ of the solenoid S have one of their terminals connected in common by means of wire 15 to the source of electric energy B, while the other terminals of these sections $s$, $s'$, $s^2$, and $s^3$ are connected, respectively, by means of wires 11, 10, 9, and 8 to the contacts $i^8$, $i^9$, $i^{10}$, and $i^{11}$. In Fig. 10 only enough of each of the contacts $i^{11}$ $i^{10}$ $i^9$ $i^8$ is indicated to show the circuit connections thereto. All these contacts are so arranged, as indicated clearly in Figs. 5, 6, and 10, that by the rotation of the brush-arm $e$ over to the left first the section $s^3$ is cut into circuit by the brush $f^2$, and then the section $s^2$ by the brush $f^3$, and then the section $s'$ by the brush $f^4$, and then the section $s$ by the brush $f^5$. Each section of the solenoid S as it is cut into circuit is retained in circuit as the movement of the brush-arm $e$ over to the left continues. As seen in Fig. 5, the brushes $f^2$, $f^3$, $f^4$, and $f^5$ are arranged to bear, respectively, upon the contacts $i^{11}$ $i^{10}$ $i^9$ $i^8$, while the brush $f^6$ is arranged to bear upon the contacts $i^7$ and $i^{14}$ and the brush $f^7$ to bear upon the contact $i^{12}$. The rotation of the brush-arm $e$ over to the left first, as already described, cuts into circuit the several sections $s^3$ $s^2$ $s'$ $s$ first in series with the sections $r$ and $r'$ of the rheostat R. Then the further rotation over to the left of this brush-arm $e$ results in cutting out first the section $r$ and then the section $r'$ of the rheostat R.

The operation of my braking mechanism is as follows, starting with the several parts in the position indicated in Figs. 1 and 2: A rotation of the handle H, carrying with it the brake-staff $b$, serves first to bring the brake-shoes $q$ firmly up against the wheels W in the usual manner, while at the same time the solenoid-core N is forced inward by reason of its connection with the lever $o^2$, so as to be well within the range of efficient operation of the coil S thereon. This action takes place prior to cutting the coil S or any of the sections thereof into operative circuit with the source of electric energy B; but when the brush $f'$ passes upon the contact $i^4$ (when the arrangement illustrated in Figs. 3 and 4 is employed) the solenoid S is cut into circuit with all the sections of the rheostat R. A further movement of the handle H then serves to cut out the sections $r^3$ $r^2$ $r'$ $r$ successively of the rheostat R, while in that modification shown in Figs. 5, 6, and 10, in which the several sections of the solenoid-coil S are connected up in parallel, when the brush $f^2$ bears upon the contact $i^{11}$ the section $s^3$ of the solenoid-coil S is cut into circuit, the further movement of the actuating-handle serving to cut into circuit the sections $s^2$, $s'$, and $s$ of the solenoid S, and then to cut out successively the sections $r$ and $r'$ of the rheostat R. The point at which the solenoid-coil S or any of the sections thereof are cut into circuit is determined, it will be understood at once, by the angular adjustment of the disk $k$, carrying the several contacts by means of which the solenoid S is cut into circuit. By rotating the disk $k$ over to the right or over to the left by means of the handle $h$ thereon, in the manner already described, the point at which this action takes place may be delayed or advanced, as desired, and thereby the apparatus may be adjusted to secure within a moderate range any desired braking effort by means of the hand-operated mechanism before the solenoid S or any of the sections thereof is cut into circuit and the braking effort from the electrically-operated mechanism is applied. By this means I am enabled to take up any amount of lost motion and provide for wear in the operating parts of the braking mechanism to which my invention is applied, as well as to secure the cutting in of the electrically-operated mechanism at any desired point in the movement of the handle H.

What I claim is—

1. In a braking system, in combination with an operating-handle, and means whereby the movement thereof applies a braking effort by means of electrically-operated mechanism, means for varying, as desired, the point in the movement of such handle at which the braking effort from such electrically-operated mechanism begins.

2. In a braking system, in combination with an operating-handle, and means whereby the movement thereof applies a braking effort by means of electrically-operated mechanism, means for varying, as desired, the point in the movement of such handle at which the braking effort from such electrically-operated mechanism reaches its maximum.

3. In a braking system, in combination with an operating-handle, and means whereby the movement thereof applies a braking effort by means of electrically-operated mechanism, means for varying, as desired, the extent of the movement of such handle throughout which the braking effort from such electrically-operated mechanism is applied.

4. In a braking system, in combination with an operating-handle arranged to apply a braking effort through a hand-operated mechanism, and also arranged to apply a braking effort by means of electrically-operated mechanism during a portion of the movement of such handle, means for varying, as desired, the point in the movement of such handle at which the braking effort from such electrically-operated mechanism begins.

5. In a braking system, in combination with an operating-handle arranged to apply a braking effort through a hand-operated mechanism, and also arranged to apply a braking effort by means of electrically-operated mechanism during a portion of the movement of such handle, means for varying, as desired, the point in the movement of such handle at which the braking effort from such electrically-operated mechanism reaches its maximum.

6. In a braking system, in combination with an operating-handle arranged to apply a braking effort through a hand-operated mechanism, and also arranged to apply a braking effort by means of electrically-operated mechanism during a portion of the movement of such handle, means for varying, as desired, the extent of the movement of such handle throughout which the braking effort from such electrically-operated mechanism is applied.

7. In a braking system in combination with an operating-handle by means of which a braking effort is applied by means of hand-operated mechanism, and by means of which also a braking effort is applied by means of electrically-operated mechanism, means for varying, as desired, the relation between the length of time during which the braking effort is applied by means of such electrically-operated mechanism and the length of time during which the braking effort is applied by means of such hand-operated mechanism.

8. In a braking system in combination with an operating-handle by means of which a braking effort is applied by means of hand-operated mechanism, and by means of which also a braking effort is applied by means of electrically-operated mechanism, means for varying, as desired, the amount of braking effort applied by such hand-operated mechanism before the application of the braking effort by means of such electrically-operated mechanism.

9. In combination with an operating-handle by means of which a mechanical effort is applied to mechanism to be operated, and by means of which also an effort is applied through electromagnetically-operated mechanism, means for varying, as desired, the amount of effort applied by such hand-operated mechanism before the application of the effort by means of such electrically-operated mechanism.

10. In a braking system in combination with an operating-handle by means of which a braking effort is applied by means of hand-operated mechanism, and by means of which also a braking effort is applied by means of electrically-operated mechanism, means for varying, as desired, the amount of braking effort applied by such hand-operated mechanism before cutting in the energizing-coils of the electrically-operated braking mechanism.

ALFRED GREEN.

Witnesses:
WILLIAM O. INGLE,
CHARLES J. HAYDEN.